US010818151B2

(12) United States Patent
Shao et al.

(10) Patent No.: US 10,818,151 B2
(45) Date of Patent: Oct. 27, 2020

(54) VIBRATION METHOD, ELECTRONIC DEVICE AND COMPUTER READABLE STORAGE MEDIUM

(71) Applicant: AAC Acoustic Technologies (Shenzhen) Co., Ltd., Shenzhen (CN)

(72) Inventors: Xiaojie Shao, Shenzhen (CN); Liang Jiang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/695,038

(22) Filed: Nov. 25, 2019

(65) Prior Publication Data

US 2020/0168058 A1    May 28, 2020

(30) Foreign Application Priority Data

Nov. 28, 2018   (CN) .......................... 2018 1 1430911

(51) Int. Cl.
  *G08B 6/00*   (2006.01)
  *A63F 13/285*   (2014.01)
(52) U.S. Cl.
  CPC .............. *G08B 6/00* (2013.01); *A63F 13/285* (2014.09)
(58) Field of Classification Search
  None
  See application file for complete search history.

(56) References Cited

U.S. PATENT DOCUMENTS

| 5,663,516 A * | 9/1997 | Kawashima | G10H 1/361 434/307 A |
| 2011/0053577 A1* | 3/2011 | Lee | H04M 1/72552 455/418 |
| 2013/0307786 A1* | 11/2013 | Heubel | G08B 6/00 345/173 |
| 2016/0162025 A1* | 6/2016 | Shah | G06F 3/016 345/156 |
| 2019/0286235 A1* | 9/2019 | Gautama | B06B 1/10 |

* cited by examiner

*Primary Examiner* — Brent Swarthout
(74) *Attorney, Agent, or Firm* — W&G Law Group LLP

(57) ABSTRACT

The present invention provides a vibration method applied to an electronic device having a vibration motor. The method includes the steps of: receiving a vibration instruction and obtaining an expected vibration effect from the vibration instruction; searching for a reference vibration effect matched with the expected vibration effect from a pre-stored vibration effect database; acquiring an effect data stream corresponding to the reference vibration effect; wherein the vibration effect database has an effect data flow which is customized according to hardware characteristic of the electronic device and corresponds to the reference vibration effect; and generating a driving signal according to the effect data flow for driving the vibration motor to vibrate. An electronic device and a computer readable storage medium are also provided.

11 Claims, 1 Drawing Sheet

VIBRATION METHOD, ELECTRONIC DEVICE AND COMPUTER READABLE STORAGE MEDIUM

FIELD OF THE PRESENT DISCLOSURE

The embodiments of the invention relate to the electronic information technical field, in particular to vibration method, an electronic device and a computer readable storage medium.

DESCRIPTION OF RELATED ART

At present, the vibration function in the terminal device is realized by giving the corresponding signal to the vibration component in the device, such as mobile phones, smart watches, AR glasses, etc., which all have the vibration function. There are many types of vibration signals in the existing terminal devices, and users can set different types of vibration signals according to the actual needs.

However, the inventor of the invention finds that users of the existing terminal devices can set different vibration signals according to the needs, but a certain or selected vibration signal applied to different devices will cause different vibration effects, due to the different hardware, driving ICs used in different devices, which badly affects the user's experience, especially for the gaining users.

Therefore, a method which can generate the same vibration effects even if the vibration signal is applied to different devices is desired.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
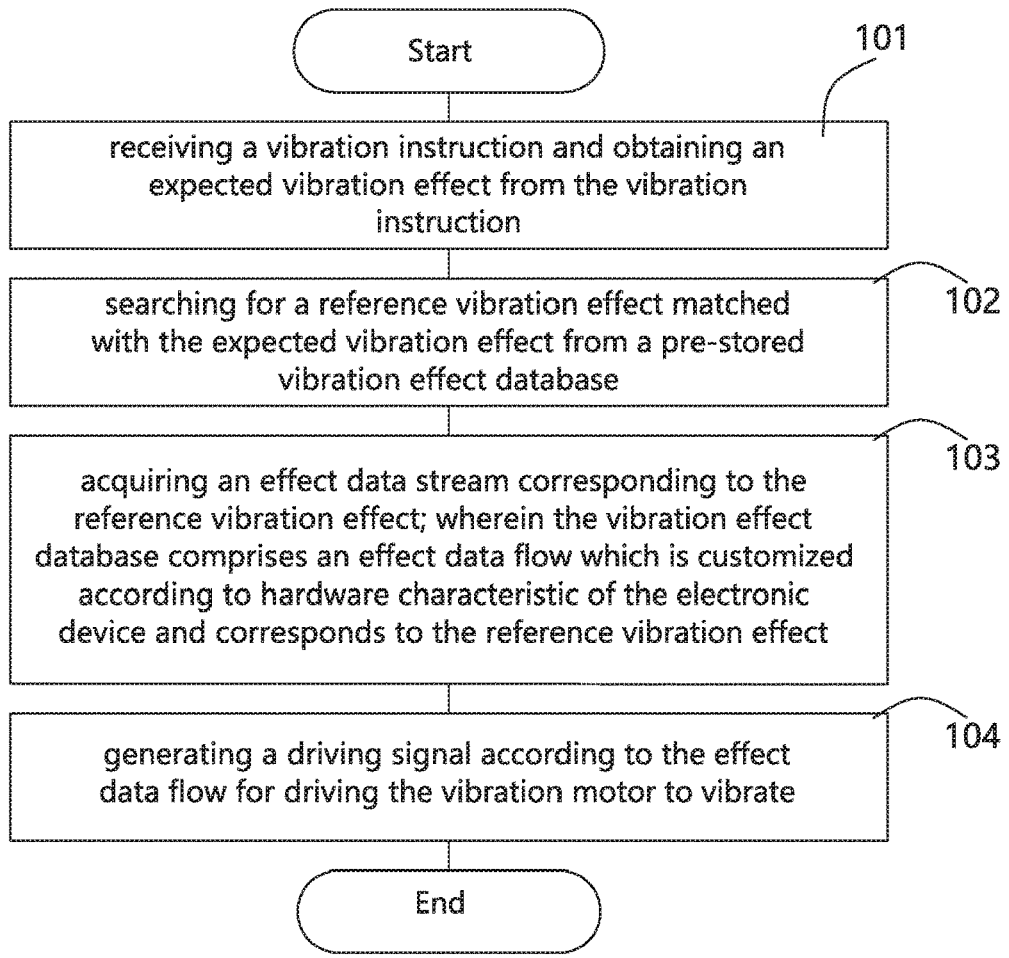
FIG. 1 is a flowchart of a vibration method in accordance with a first embodiment of the invention.

The first embodiment of the invention relates to a vibration method. The specific flowchart is shown in FIG. 1. The vibration method is used in an electric device incorporating a vibration motor.

The vibration method comprises the following steps:
receiving a vibration instruction;
acquiring an expected vibration effect from the vibration instruction;
finding a reference vibration effect matched with the expected vibration effect from a pre-stored vibration effect database;
obtaining an effect data flow corresponding to the reference vibration effect, wherein the vibration effect database includes the effect data flow which is customized according to the hardware characteristic of the electronic device and is corresponding to the reference vibration effect;
generating a driving signal according to the effect data flow, and driving the vibration motor by using the driving signal.

Due to the fact that the hardware characteristics of different electronic devices are different, the vibration effects produced by the same vibration instruction on different electronic devices are not consistent, so that the user's experience is badly influenced, and especially for the game application, the user's experience is much more influenced.

In the embodiment, the vibration effect database comprising the corresponding relationship between the reference vibration effect and the effect data flow is pre-stored in the electronic device in advance. The effect data flow in the vibration effect database is customized according to the hardware characteristics of the electronic device. The effect data flow which is customized according to the reference vibration effect and the different hardware characteristics of the electronic device is more consistent with the hardware characteristic of the electronic device. The vibration motor is driven to vibrate by the driving signals generated according to the effect data flow. Therefore, the vibration of the vibration motor is more consistent with the hardware characteristic of the electronic device, so that the vibration effect of the vibration motor on different electronic device is consistent, especially for the game application, the user's experience is greatly improved. The implementation details of the vibration method according to the embodiment are specifically described below, and the following content is only the implementation details provided for convenience of understanding and is not necessary for implementing the technical scheme.

Referring to FIG. 1, the vibration method comprises the following steps:

step 101: receiving a vibration instruction and obtaining an expected vibration effect from the vibration instruction; wherein Specifically, the user can operate an application program on a display interface of the electronic device, and various functions of the application program, such as sound generation and vibration, can be realized. The operating system of the electronic device can sense the operation of the user on the input equipment of the electronic device. The operating system of the electronic device sends the information to the message queue, and the message response function carries out corresponding processing. In the embodiment, when the operating system of the electronic device receives a vibration message of an application program, a vibration instruction is generated, and the vibration instruction is processed by the message response function to obtain the expected vibration effect;

step 102, searching for a reference vibration effect matched with the expected vibration effect from the pre-stored vibration effect database;

step 103: acquiring an effect data stream corresponding to the reference vibration effect; wherein specifically, in the above steps 102 and 103, the vibration effect database is pre-stored in the electronic device in the embodiment, and a corresponding relation between the reference vibration effect and the effect data stream is stored in the vibration effect database; further the effect data flow in the vibration effect database is customized according to the hardware characteristic of the electronic device according to the reference vibration effect. Due to the fact that the hardware characteristics of different electronic device are different, and the hardware characteristics of the motor model, the driving chip model, the electronic device hardware structure and the like are different, and the vibration effect of the vibration messages sent by the same application program on different electronic device is not consistent, so that the user's experience is influenced. The consistent vibration effect is especially important. The effect data flow in the vibration effect database in the embodiment is customized according to the hardware characteristics of the electronic device according to the reference vibration effect, and the reference vibration effect is combined with the different hardware characteristics (motor models) of the electronic device according to the reference vibration effect, the driving chip model and one or a combination of the hardware structures of the electronic device), so that the customized effect data flow is more accordant with the hardware characteristic of the electronic device. After the expected vibration effect is obtained from the vibration instruction, a reference vibration effect matched with the expected vibration effect is obtained from the pre-stored vibration effect database according to the obtained expected vibration effect, namely judge whether the expected vibration effect belongs to one of the reference vibration effects stored in the vibration effect database in advance or not, and if the expected vibration effect belongs to one of the reference vibration effects stored in the vibration effect database in advance, the expected vibration effect is the same as the reference vibration effect in the vibration effect database; the effect data flow corresponding to the reference vibration effect in the vibration effect database is obtained;

Further, if the reference vibration effect is not matched according to the expected vibration effect, the reference vibration effect with the highest similarity with the expected vibration effect is found from the vibration effect database; acquiring the effect data stream corresponding to the reference vibration effect with the highest similarity;

specifically, if the expected vibration effect does not belong to any one of the reference vibration effects stored in the vibration effect database in advance, that is, the expected vibration effect is not matched with any reference vibration effect in the vibration effect database, and then a reference vibration effect with the highest similarity with the expected vibration effect is found from the vibration effect database, searching can be carried out in an one-to-one mode, and the effect data flow of the reference vibration effect with the highest similarity with the expected vibration effect is obtained. The effect data stream corresponding to the reference vibration effect with the highest expected vibration effect similarity is obtained while the expected vibration effect is not matched with any one of the reference vibration effects in the vibration effect database, so that the consistency of the vibration effect can still be ensured as far as possible under the condition that the corresponding relation between the expected vibration effect and the effect data flow is not stored in the vibration effect database;

step 104, generating a driving signal according to the effect data flow, for driving the vibration motor to vibrate;

specifically, the effect data flow obtained according to the above steps is generated by the driving chip to generate the driving signal, and the driving signal generated by the effect data flow is used for controlling the driver to vibrate. Due to the fact that the effect data flow in the vibration effect database is customized according to the hardware characteristics of the electronic device according to the reference vibration effect, the hardware characteristic of the electronic device is better met. The vibration of the vibration motor is driven by the driving signals generated according to the effect data flow, so that the vibration of the vibration motor is more consistent with the hardware characteristic of the electronic device. Thus, the vibration effects of the vibration on different electronic devices can be realized, and especially for the game application, the user's experience is greatly improved. A reference signal is stored in the vibration motor. The driving signal is generated according to the effect data flow. The driving signal is generated by changing the waveform, the amplitude, or phase of the reference signal according to the effect data flow. Therefore, a method for generating a drive signal according to an effect data stream is provided by the present invention.

Further, the vibration effect database in the embodiment is stored in a driving chip of the vibration motor. Before finding the reference vibration effect matched with the expected vibration effect from the pre-stored vibration effect database, the method further comprises the step of storing the vibration effect database in advance in the driving chip of the vibration motor. The vibration effect database is stored in the driving chip of the vibration motor, so that the reference vibration effect is found, the data flow corresponding to the reference vibration effect is determined, and a driving signal is generated according to the effect data flow. And the action of driving the vibration motor to vibrate by using the driving signals is carried out in a driving chip of the electronic device, so that the reaction speed of the electronic device is accelerated.

In addition, the vibration effect database in the embodiment can also be stored in a read-only memory of the electronic device. Before finding a reference vibration effect matched with the expected vibration effect from the pre-stored vibration effect database, the method further comprises: a vibration effect database is stored in a read-only memory of the electronic device in advance. The invention provides another storage mode of for the vibration effect database.

Compared with the related art, the vibration method is applied to the electronic device with the vibration motor, and comprises the following steps: receiving a vibration instruction; obtaining an expected vibration effect from the vibration instruction; finding a reference vibration effect matched with the expected vibration effect from the pre-stored vibration effect database; obtaining an effect data flow corresponding to the reference vibration effect; generating a driving signal according to the effect data flow for driving the vibration motor to vibrate. Wherein the vibration effect database is customized according to the hardware characteristic of the electronic device, the effect data flow corresponding to the reference vibration effect. In the embodiment, the vibration effect database comprising the corresponding relation between the reference vibration effect and the effect data flow is stored in the electronic device in advance. The effect data flow in the vibration effect database is customized according to the hardware characteristics of the electronic device. The effect data flow which is customized according to the reference vibration effect and the different hardware characteristics of the electronic device is more consistent with the hardware characteristic of the electronic device. The vibration motor is driven to vibrate by the driving signals generated according to the effect data flow. Therefore, the vibration of the vibration motor is more consistent with the hardware characteristic of the electronic device, so that the vibration effect of the vibration motor on different electronic device is consistent. The user's experience is greatly improved.

The steps of the method described above are divided only for clearly describing the invention. In fact, the steps can be combined into one step or some steps can be split and decomposed into a plurality of steps as long as the same logical relationship is included.

Figure 2:
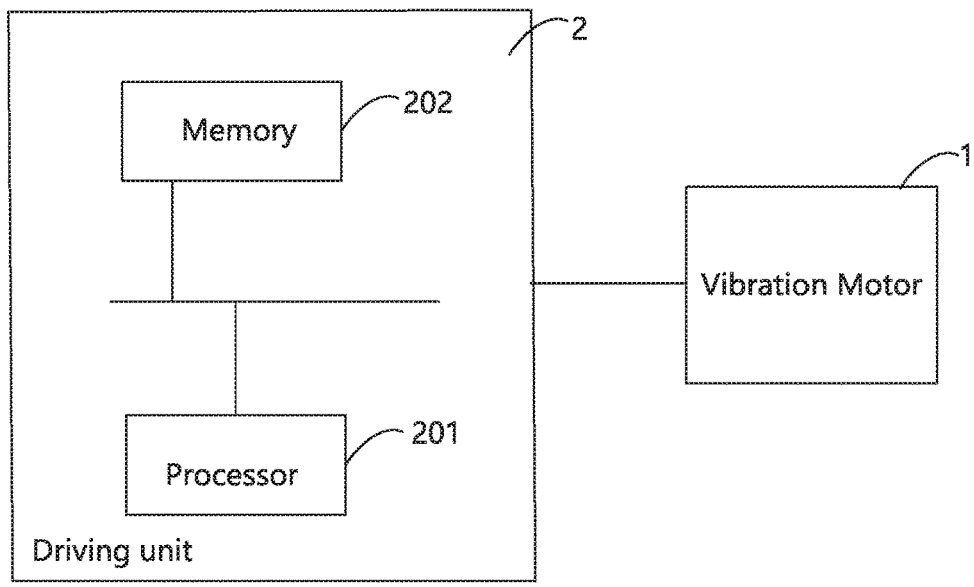
FIG. 2 is an illustrative view of an electronic device in accordance with a second embodiment of the invention.

The second embodiment of the invention relates to an electronic device. As shown in FIG. 2, the electronic device comprises a vibration motor 1 and a driving unit 2 used for driving the vibration motor 1 to vibrate. The vibration motor 1 is connected with the driving unit 2. The driving unit 2 comprises at least one processor 201, and a memory 202 which is in communication with the at least one processor 201, wherein the memory 202 stores instructions executable by the at least one processor 201. Instruction is executed by the at least one processor 201 so that the at least one processor 201 can execute the vibration method described above.

The memory 202 and the processor 201 are connected in a bus mode, and the bus can include any number of interconnected buses and bridges. The bus connects the one or more processors with various circuits of the memory 202. The bus may also connect various other circuits, such as peripheral devices, voltage regulators, power management circuits, and the like. The bus interface provides an interface between the bus and the transceiver. The transceiver may be an element or may be a plurality of elements, such as a plurality of receivers and transmitters, provides a single element for communicating with various other devices over a transmission medium. Data processed by the processor is transmitted on a wireless medium through an antenna, and further, the antenna receives data and transmits the data to the processor.

The processor 201 is responsible for managing bus and general processing, and can also provide various functions including timing, peripheral interface, voltage regulation, power management and other control functions. The memory 202 is used to store data used by the processor when performing the operation.

The embodiment of the invention further provides a computer readable storage medium, wherein the computer readable storage medium is stored with a computer program, and the computer program is executed by the processor to implement the vibration method.

Persons skilled in the art can understand that all or part of the steps in the method for implementing the embodiments of the present invention can be completed by instructing relevant hardware through a program. The program is stored in a storage medium, and comprises a plurality of instructions for enabling one device (which can be a single chip microcomputer, a chip or the like) or a processor (processor)) to execute all or part of the steps of the method disclosed by the embodiment. The storage medium comprises a USB flash disk, a mobile hard disk, a read-only memory (ROM, read-only memory), a random access memory (random access memory), a magnetic disk or an optical disk and other media capable of storing program codes.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration method applied to an electronic device having a vibration motor, comprising the steps of:
    receiving a vibration instruction and obtaining an expected vibration effect from the vibration instruction;
    searching for a reference vibration effect matched with the expected vibration effect from a pre-stored vibration effect database;
    acquiring an effect data stream corresponding to the reference vibration effect; wherein the vibration effect database comprises an effect data flow which is customized according to hardware characteristic of the electronic device and corresponds to the reference vibration effect;
    generating a driving signal according to the effect data flow for driving the vibration motor to vibrate; and
    if a reference vibration effect matched with the expected vibration effect is not found, finding a reference vibration effect with a highest similarity with the expected vibration effect from the vibration effect database;
    acquiring an effect data stream corresponding to the reference vibration effect with the highest similarity;
    generating a driving signal according to the effect data flow, and driving the vibrator to vibrate.

2. The vibration method as described in claim 1, wherein before the reference vibration effect matched with the expected vibration effect is found in the pre-stored vibration effect database, the method further comprises the following steps:
    the vibration effect database is pre-stored in a driving chip of the vibration motor.

3. The vibration method as described in claim 1, wherein before the reference vibration effect matched with the expected vibration effect is found in the pre-stored vibration effect database, the method further comprises the following steps:
    the vibration effect database is pre-stored in a read-only memory of the electronic device.

4. The vibration method as described in claim 1, wherein, a reference signal is stored in the vibration motor; and the step of generating the drive signal according to the effect data stream specifically comprises the step of:
    generating the driving signal by changing any one or a combination of waveform, amplitude and phase of the reference signal according to the effect data stream.

5. The vibration method as described in claim 1, wherein, the hardware characteristic of the electronic device comprises one or any combination of a driving chip model, a motor model and a hardware structure.

6. The vibration method as described in claim 5, further comprising:
    if a reference vibration effect matched with the expected vibration effect is not found, finding a reference vibration effect with the highest similarity with the expected vibration effect from the vibration effect database;
    acquiring an effect data stream corresponding to the reference vibration effect with the highest similarity;
    generating a driving signal according to the effect data flow, and driving the vibrator to vibrate.

7. The vibration method as described in claim 5, wherein before the reference vibration effect matched with the expected vibration effect is found in the pre-stored vibration effect database, the method further comprises the following steps:
    the vibration effect database is pre-stored in a driving chip of the vibration motor.

8. The vibration method as described in claim 5, wherein before the reference vibration effect matched with the expected vibration effect is found in the pre-stored vibration effect database, the method further comprises the following steps:

the vibration effect database is pre-stored in a read-only memory of the electronic device.

9. The vibration method as described in claim 5, wherein, a reference signal is stored in the vibration motor; and the step of generating the drive signal according to the effect data stream specifically comprises the step of:

generating the driving signal by changing any one or a combination of waveform, amplitude and phase of the reference signal according to the effect data stream.

10. An electronic device, comprising a vibration motor and a driving unit for being connected with and driving the vibration motor to vibrate; wherein the driving unit comprises:

at least one processor; and, a memory which is in communication with the at least one processor, the memory storing instructions executable by the at least one processor, the instructions being executed by the at least one processor, such that the at least one processor can execute the vibration method as described in claim 1.

11. A computer readable storage medium for storing a computer program, wherein the computer program is executed by a processor, such that the vibration method as described in claim 1 is realized when the computer program is executed by the processor.

\* \* \* \* \*